United States Patent
Phillips et al.

(10) Patent No.: US 7,316,529 B2
(45) Date of Patent: Jan. 8, 2008

(54) ROUTER BIT SYSTEM

(75) Inventors: Alan Phillips, Jackson, TN (US); John W. Schnell, Jackson, TN (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/584,219

(22) Filed: Oct. 20, 2006

(65) Prior Publication Data

US 2007/0098510 A1    May 3, 2007

Related U.S. Application Data

(63) Continuation of application No. 10/626,842, filed on Jul. 23, 2003, now Pat. No. 7,140,817.

(60) Provisional application No. 60/398,343, filed on Jul. 23, 2002.

(51) Int. Cl.
*B23C 1/20* (2006.01)
*B23B 31/14* (2006.01)

(52) U.S. Cl. ................. 409/182; 409/179; 144/136.95; 144/154.5; 279/22; 279/23.1; 279/131; 408/240

(58) Field of Classification Search ............... 409/182, 409/179, 180, 181; 408/240, 239 A; 144/136.95, 144/154.5; 279/22, 23.1, 24, 30, 75, 54, 279/55, 9.1, 46.2, 46.4, 131, 129, 102, 140, 279/46.1, 904, 902
See application file for complete search history.

(56) References Cited

U.S. PATENT DOCUMENTS 4,818,157 A * 4/1989 Kouvelis .................. 408/240
5,820,135 A * 10/1998 Han et al. .................. 279/131
5,826,888 A * 10/1998 Weaver et al. ............. 279/23.1
6,561,523 B1 * 5/2003 Wienhold .................. 279/905
6,623,220 B2 * 9/2003 Nuss et al. ................ 279/905
6,688,610 B2 * 2/2004 Huggins et al. ............ 279/22
6,695,321 B2 * 2/2004 Bedi et al. ................. 279/22
2001/0043841 A1 * 11/2001 Wienhold .................. 408/240

FOREIGN PATENT DOCUMENTS

JP          2002355757          12/2002

OTHER PUBLICATIONS

Jacobs 33839 Power Collect Keyless Router Chuck (For Porter Cable 690 Series): Toolrealm.com.
Search results for "QuickRout" www.sears.com.
Wrenchless Router Collect, www.plasticsmag.com/ta.asp?aid=1858: Jul. 10, 2003.
The New Tool Gang: Handy: Sep./Oct.2003;p. 34.

* cited by examiner

*Primary Examiner*—Dana Ross
(74) *Attorney, Agent, or Firm*—Scott B. Markow

(57) ABSTRACT

A router bit system includes a bit (or bits) and a bit holding assembly for attaching the bit to the drive shaft of a router without the use of additional hand tools. The bit holding assembly, which is attached to the drive shaft of the router, includes a chuck having a bore for receiving a shank of the bit. A collar for engaging and releasing the bit from the bit holding assembly slides between a first position for engaging the bit and a second position for releasing the bit. The collar is biased to the first position for engaging the bit. The bit is capable of being received in a standard collet-type bit holder, such as a standard router collet or the like.

16 Claims, 9 Drawing Sheets

ROUTER BIT SYSTEM

CROSS REFERENCE TO RELATED APPLICATIONS

The present application is a continuation of U.S. patent application Ser. No. 10/626,842, titled "Router Bit System," filed Jul. 23, 2003, now U.S. Pat. No. 7,140,817, which claims the benefit under 35 U.S.C. § 119(e) of U.S. Provisional Application Ser. No 60/398,343 filed Jul. 23, 2002. Said U.S. Provisional Application Ser. No. 60/398,343 and U.S. patent application Ser. No. 10/626/842 are herein incorporated by reference in their entirety.

FIELD OF THE INVENTION

The present invention generally relates to the field of routers including, but not limited to, hand-held routers, table-mounted routers, pocket cutters, laminate trimmers, rotary cutout tools, and the like, and more particularly to a router bit system including a bit and router bit holding assembly which allows insertion and removal of the bit without the use of tools.

BACKGROUND OF THE INVENTION

When changing the bit of a router, it is necessary to use hand tools such as wrenches, or the like, in order to provide adequate mechanical advantage to safely tighten or loosen the bit within a router collet or the like. For instance, most routers require the use of a first wrench to lock a router drive shaft from rotation while a second wrench is used to loosen a bit attached to the drive shaft. However, it is desirable to quickly attach a bit to a drive shaft or to quickly remove the bit from the drive shaft. For example, several router bits may be needed throughout the course of shaping a single work piece with a hand-held router, and it may be desirable to change between the bits quickly and efficiently. The use of one or more wrenches or like tools for changing between the bits is inefficient and thus undesirable in such applications, because of the additional time and effort required for attaching and removing the bits to and from the drive shaft via the wrenches.

Additionally, because a collet or the like for engaging the router bit is usually recessed within a shield or shroud, or surrounded by an assembly such as a router table or the like, it may be very difficult to reach the collet and the drive shaft with tools such as wrenches, or the like, for changing the bit. Another problem may arise when a router bit must be secured to a drive shaft at a remote location. The absence of a wrench or some other suitable device may effectively prevent the removal or replacement of the bit from the drive shaft.

SUMMARY OF THE INVENTION

Accordingly, the present invention is directed to a router bit system including a bit (or bits) and router bit holding assembly for attaching the bit to the drive shaft of a router without the use of additional hand tools. In exemplary embodiments of the invention, a bit includes a cutting head and a shank having an annular groove formed therein. The router bit holding assembly, which may be attached to the drive shaft of the router, includes a chuck having a bore for receiving the shank of the bit. An opening is radially formed through the chuck for receiving a ball which engages the annular groove of the shank when the shank is received in the bore. A collar is concentrically disposed about the chuck so that the collar may slide axially between a first position and a second position. The collar moves to the first position for holding the ball in engagement with the annular groove and is moved to the second position for allowing the ball to be disengaged from the annular groove. In embodiments of the invention, the collar is biased to the first position for causing the ball to engage the bit.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
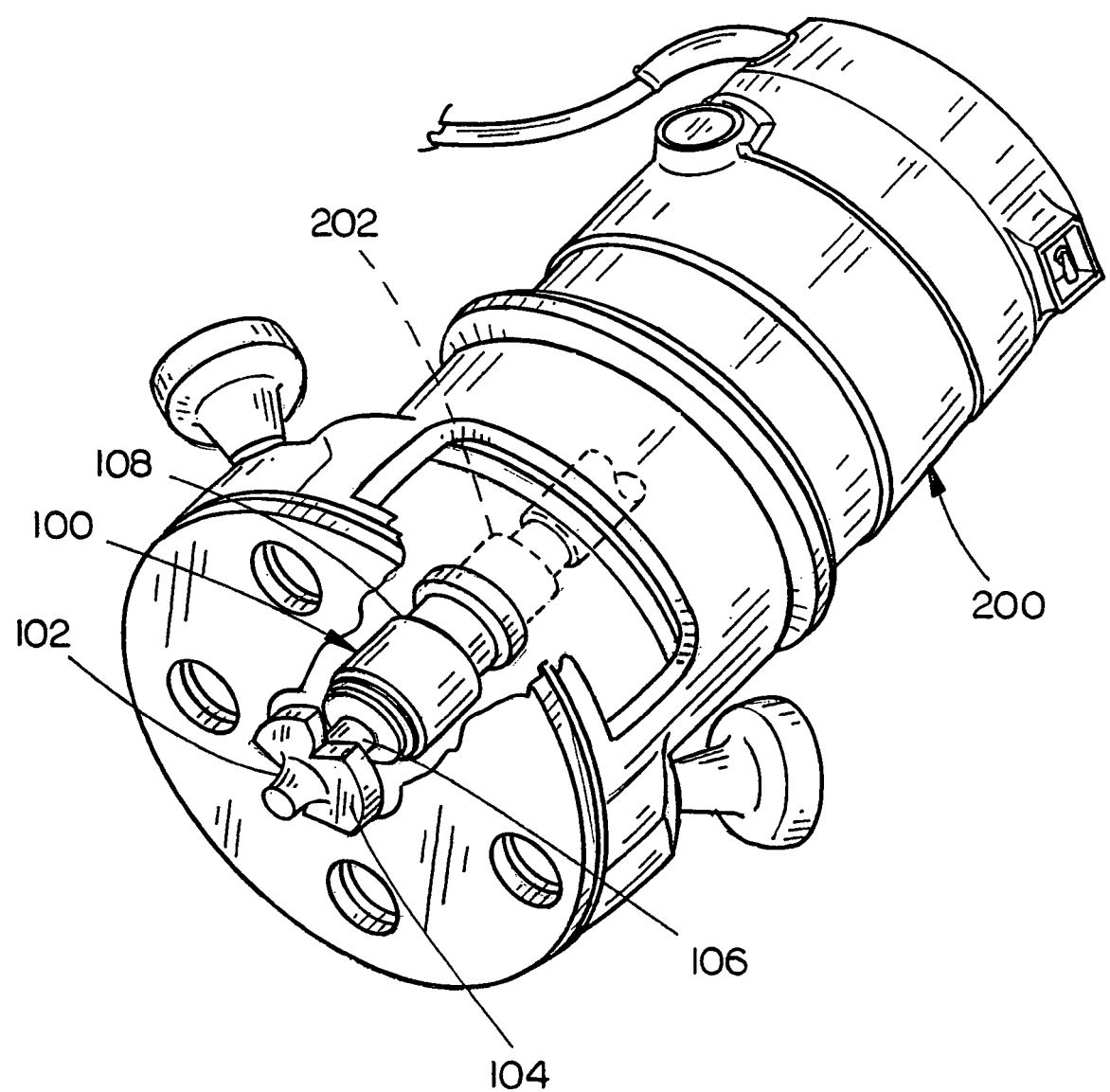
FIG. 1 is an isometric view illustrating a router bit system in accordance with an exemplary embodiment of the present invention, attached to a router.

Reference will now be made in detail to the presently preferred embodiments of the invention, examples of which are illustrated in the accompanying drawings.

Referring generally to FIGS. 1 through 12, a router bit system 100 in accordance with exemplary embodiments of the present invention is described. The router bit system 100 includes a bit 102 and router bit holding assembly for attaching the bit 102 to the drive shaft 202 of a router 200 without the use of additional hand tools. In exemplary embodiments of the invention, the bit 102 includes a cutting head 104 and a shank 106 having an annular groove 116 formed therein. The router bit holding assembly, which is attached to the drive shaft 202 of the router 200, includes a chuck 110 having a bore 111 for receiving the shank 106 of the bit 102. An opening is radially formed through the chuck 110 for receiving a ball 114 which engages the annular groove 116 of the shank 106 when the shank 106 is received in the bore 111. A collar 112 is concentrically disposed about the chuck 110 so that the collar 112 may slide axially between a first position and a second position. The collar 112 moves to the first position for holding the ball 114 in engagement with the annular groove 116 and is moved to the second position for allowing the ball 114 to be disengaged from the annular groove 116. In embodiments of the invention, the collar 112 is biased to the first position for causing the ball 114 to engage the bit 102

Referring now to FIG. 1, a router bit system 100 includes a bit and router bit holding assembly in accordance with exemplary embodiments of the present invention attaches to a drive shaft 202 of a router assembly 200 or the like. In exemplary embodiments of the present invention, the router bit system 100 is fixedly attached to the drive shaft 202, for rotating the drive shaft 202 and a bit 102 or the like for material removal. For instance, the bit 102 may include a cutting head 104 for shaping a workpiece and a shank 106 removably received by a bit holding assembly 108, the bit holding assembly 108 being fixedly attached to the drive shaft 202 for rotating the drive shaft 202 and the bit 102.

Figure 2:
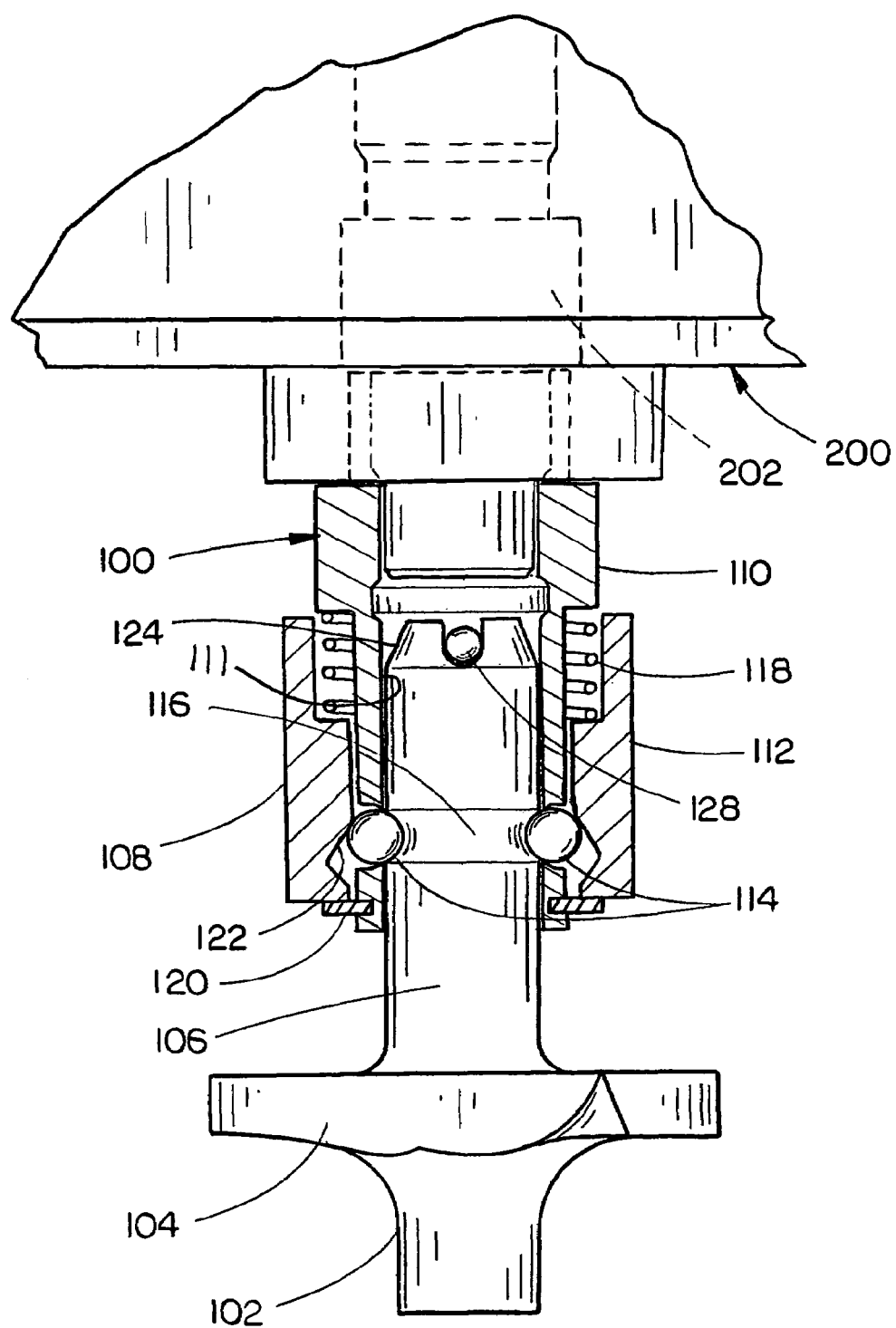
FIG. 2 is a cross-sectional side elevation view of the router bit system illustrated in FIG. 1, wherein a bit is engaged with the bit holding assembly.
Figure 3:
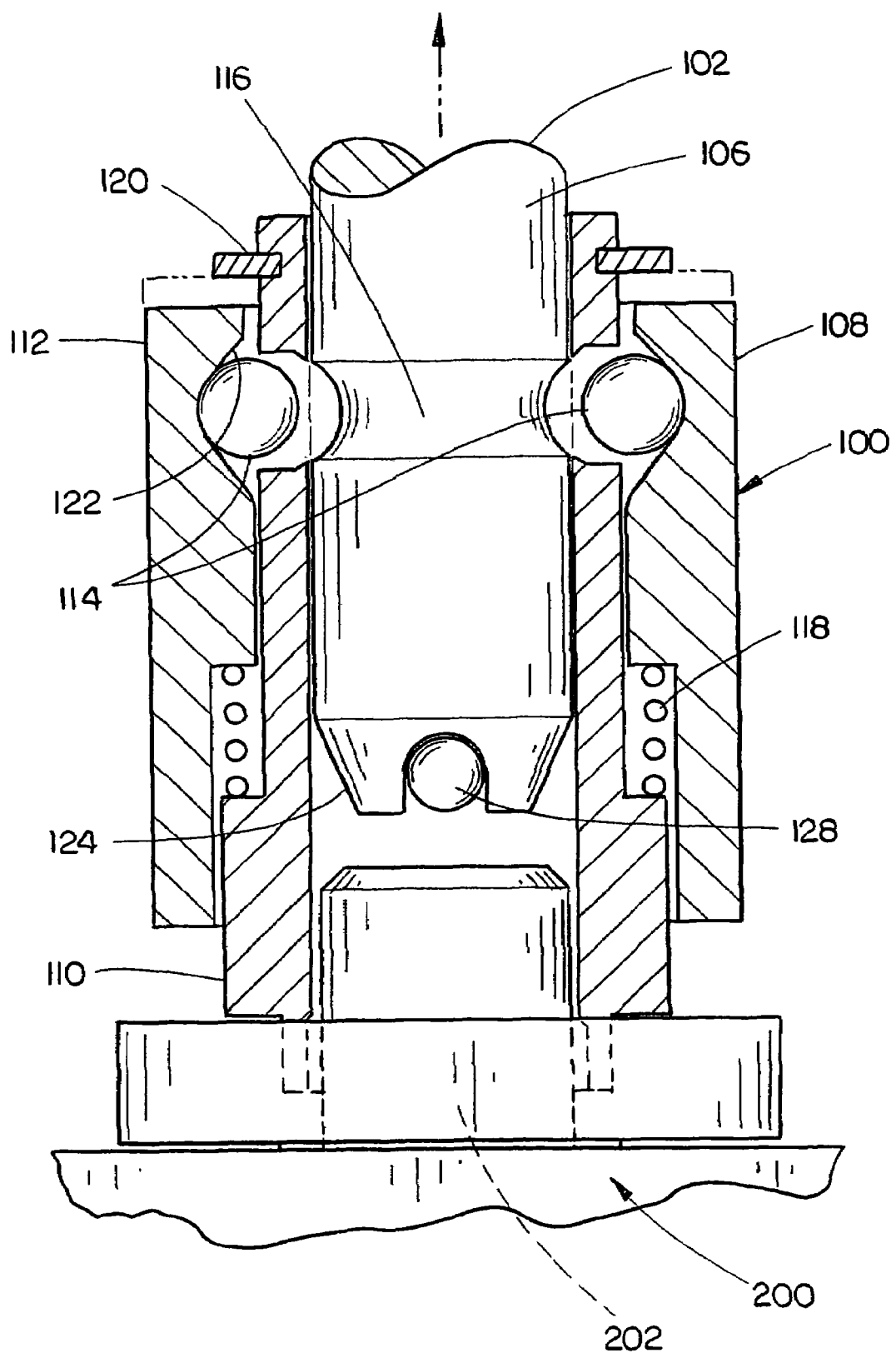
FIG. 3 is a cross-sectional side elevation view of the router bit system illustrated in FIG. 1, wherein the bit is released from the bit holding assembly.
Figure 4:
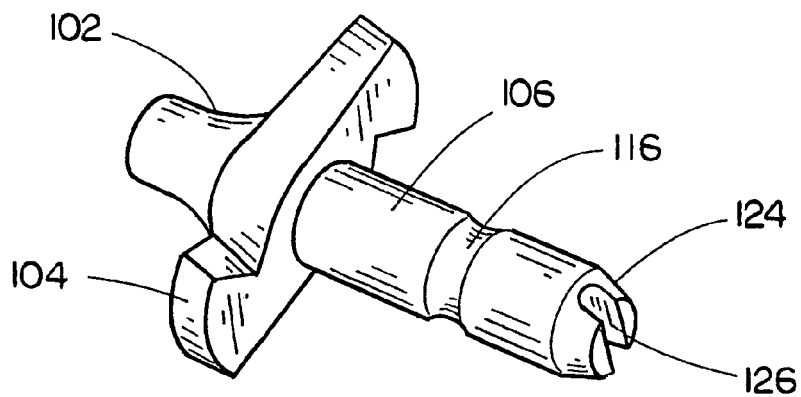
FIG. 4 is an isometric view illustrating an exemplary bit of the router bit system illustrated in FIG. 1.
Figure 5:
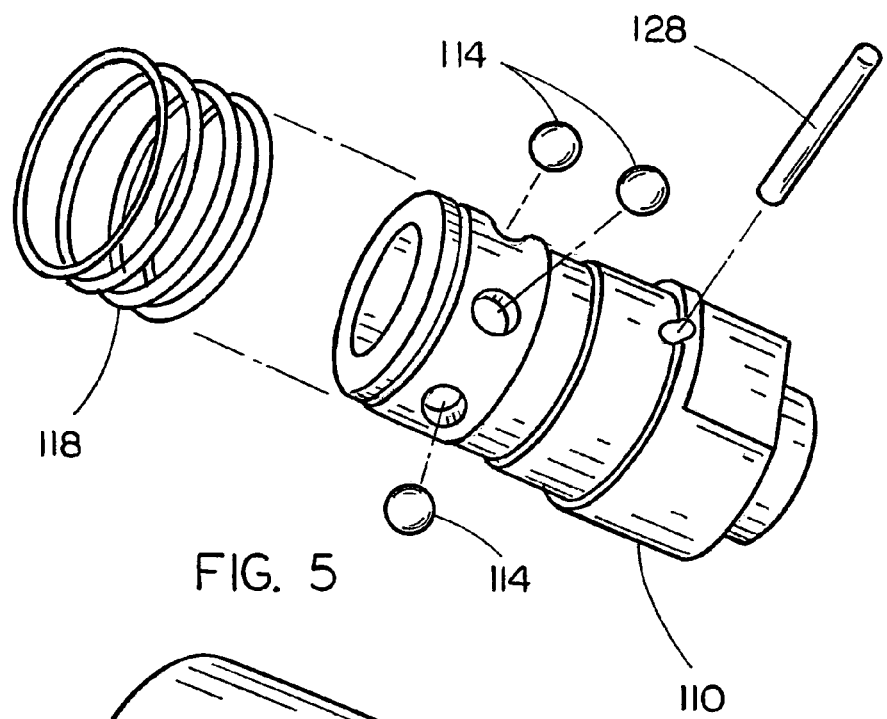
FIG. 5 is a partially exploded isometric view illustrating the bit holding assembly of the router bit system illustrated in FIG. 1.
Figure 6:
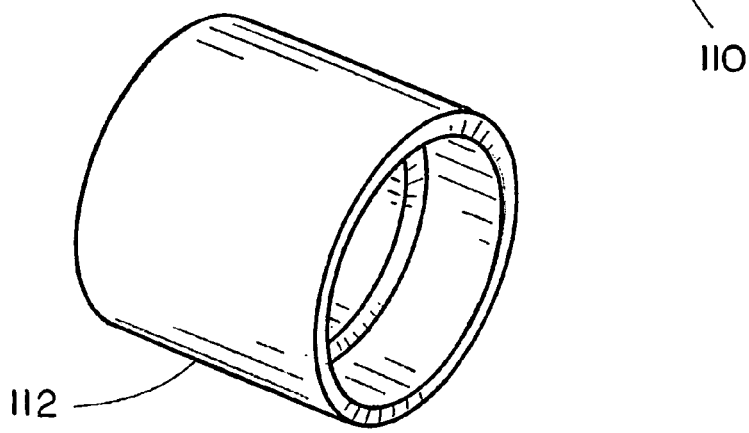
FIG. 6 is an isometric view illustrating the collar of the router bit system illustrated in FIG. 1.

Referring to FIGS. 2 through 6, the bit holding assembly 108 attached to the drive shaft 202 includes a chuck 110 having a bore shaped for receiving the shank 106 of the bit 102 and a collar 112 for alternately engaging and releasing the bit 102 from the bit holding assembly 108. In exemplary embodiments of the present invention, the chuck 110 includes one or more radially formed openings for receiving ball 114 retained between the chuck 110 and the collar 112. The openings are shaped for allowing the ball 114 to extend at least partially into the bore, for engaging an annular groove 116 formed in the shank 106 of the bit 102 when the shank 106 is received in the bore. For instance, as illustrated in FIG. 2, in a first position the collar 112 may hold the ball 114 in engagement with the annular groove 116 formed in the shank 106 of the bit 102 for engaging the bit 102 with the bit holding assembly 108; in a second position as illustrated in FIG. 3, the collar 112 may allow the ball 114 to be disengaged from the annular groove 116 formed in the shank 106 of the bit 102 for releasing the bit 102 from the bit holding assembly 108.

While the ball 114 is shown as spherical in the exemplary embodiments illustrated in the accompanying figures, those of ordinary skill in the art will appreciate that the ball 114 may have a more irregular shape, being ellipsoid or the like, for providing a cam action or the like in engaging the annular groove 116 formed in the shank 106 of the bit 102 when the shank 106 is received in the bore. It should also be noted that the ball 114 may be formed as the ends of pins, rods, or the like, or attached thereto without departing from the scope and intent of the present invention. In an alternative embodiment, pins may be included in angled grooves, such that the pins are tangential to the shank 106 of the bit 102 when engaged and are biased for engaging the annular groove 116 of the shank 106. Those of ordinary skill in the art will further appreciate that the annular groove 116 may be non-continuous, including a series of one or more indents, detentions, or the like, corresponding to circumferential placement of the balls 114 about the bore. It should be noted that the use of indents, detentions, or the like for being engaged by the ball 114 when the shank 106 is received in the bore may require alignment of the bit 102 relative to the chuck 110 before the collar 112 is moved to the first position, for engaging the bit 102 in the bit holding assembly 108. It should also be noted that while the exemplary embodiments illustrated in the accompanying figures show a plurality of balls 114, more or fewer balls may be used without departing from the scope and spirit of the present invention; for example, one ball 114 may be retained between the chuck 110 and the collar 112 for engaging the annular groove 116.

The collar 112 for engaging and releasing the bit 102 from the bit holding assembly 108 is concentrically coupled with the chuck 110, axially sliding between the first position for holding the balls 114 in engagement with the annular groove 116, and the second position for allowing the balls 114 to be disengaged from the annular groove 116. In exemplary embodiments of the present invention, the collar 112 is coupled between a spring assembly such as a compression spring 118 or the like, and a retaining mechanism such as a retaining collar 120 or the like. The retaining collar 120 and the compression spring 118 may be concentrically coupled with the chuck 110, the collar 112 being compressed between the retaining collar 120 and the compression spring 118. The compression spring 118 serves to bias the collar 112 to the first position for holding the balls 114 in engagement with the annular groove 116 formed in the shank 106 of the bit 102, as illustrated in FIG. 2. Compressing the compression spring 118 and moving the collar 112 to the second position allows the balls 114 to be disengaged from the annular groove 116 and biased toward an internal annular tapered groove 122 in the collar 112 for releasing the bit 102 from the bit holding assembly 108, as illustrated in FIG. 3. Those of ordinary skill in the art will appreciate that a number of different spring assemblies and retaining mechanisms may be used for biasing and retaining the collar 112 without departing from the scope and spirit of the present invention.

In exemplary embodiments of the present invention, the shank 106 of the bit 102 includes a tapered end 124 for biasing the balls 114 toward the internal annular tapered groove 122 in the collar 112 when inserting the bit 102 into the bore of the chuck 110 and the like. The bore of the chuck 110 may also be tapered or the like for receiving the tapered end 124 of the bit 102. Additionally, the shank 106 includes a slot 126 or the like for engaging with a pin 128, a rod, or the like extending through the bore, for at least substantially preventing rotation of the shank 106 within the bore. Alternately, the bore of the chuck 110 or the like may be formed to engage with the slot 126 or the like in the shank 106, for at least substantially preventing rotation of the shank 106 within the bore. It should be noted that the bit 102 including the tapered end 124 and the slot 126 is capable of being received in a standard collet-type bit holder, such as a standard router collet or the like, in accordance with exemplary embodiments of the present invention. It should also be noted that while the slot 126 is shown centered across the tapered end 124, it may be offset from an axis of the bit 102 without departing from the scope and intent of the present invention. Further, those of ordinary skill in the art will appreciate that the shank 106 of the bit 102 may be shaped to engage the chuck 110 when the shank 106 is received in the bore of the chuck 110 or the like, for at least substantially preventing rotation of the shank 106 within the bore. For example, the bore of the chuck 110 may have a faceted portion, such as hexagonal, octagonal, or the like, for engaging a correspondingly faceted portion of the shank 106 of the bit 102. The faceted portion may extend the length of the bore and the shank 106, or merely a portion thereof. Alternately, an elliptical portion, a circular portion having one or more substantially flat sides, or the like may be utilized without departing from the scope and intent of the present invention.

Figure 7:
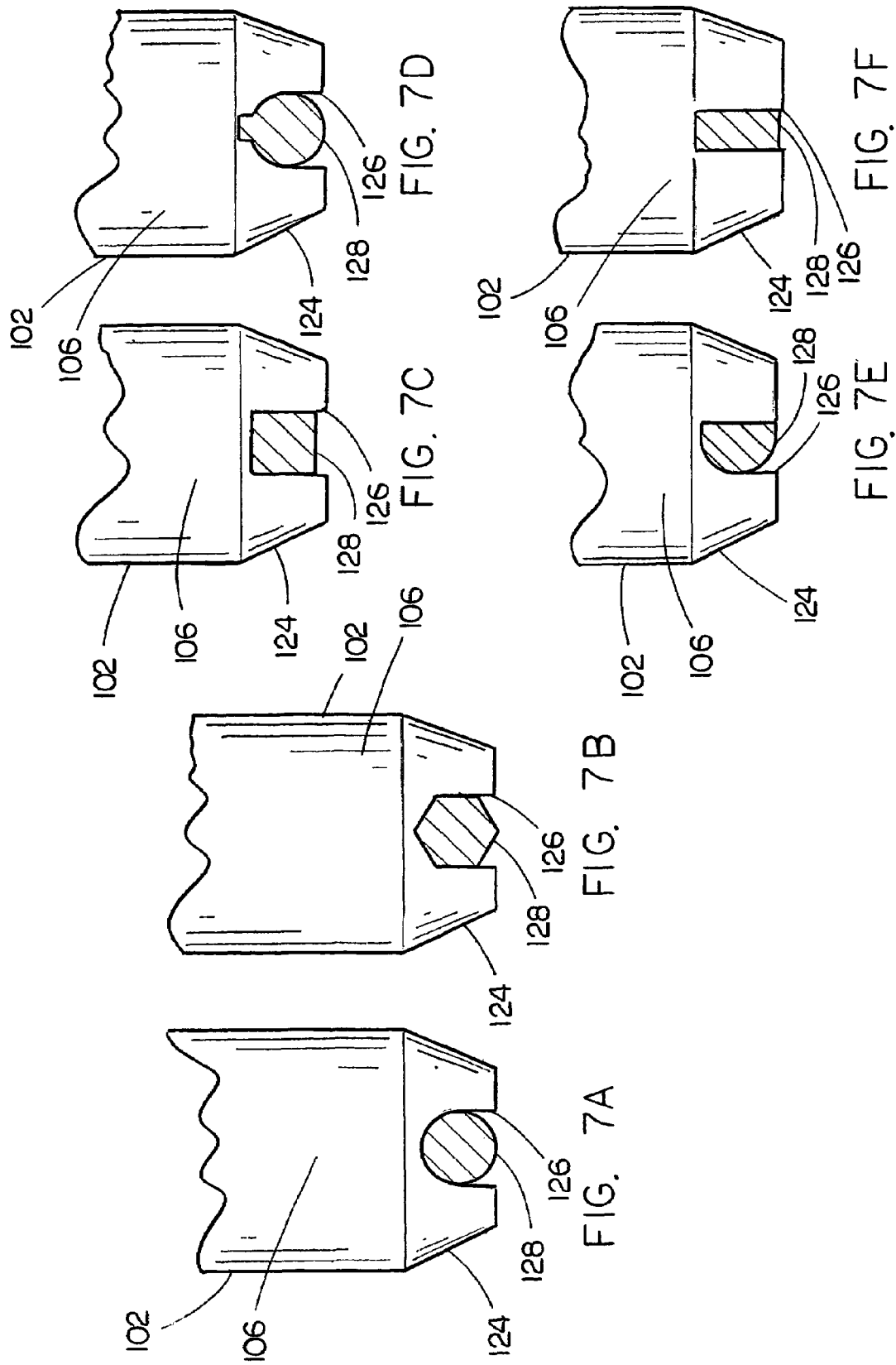
FIG. 7 is a partial cross-sectional side view of a pin and a bit router bit system illustrated in FIG. 1, wherein the bit includes a shank having a tapered end and a slot for engaging the pin in accordance with exemplary embodiments of the present invention.

Referring now to FIG. 7, the pin 128 and the corresponding slot 126 included in the shank 106 of the bit 102 may take many various shapes and forms without departing from the scope and spirit of the present invention. For instance, the pin may be circular as illustrated in FIG. 7A, hexagonal as illustrated in FIG. 7B, square as illustrated in FIG. 7C, round having a raised or notched portion as illustrated in FIG. 7D, semicircular as illustrated in FIG. 7E, rectangular as illustrated in FIG. 7F, and the like. Those of ordinary skill in the art will appreciate that pins of many various shapes, sizes, and the like may be used. It should also be noted that more than one pin, irregularly shaped pins, and the like may be used for at least substantially preventing rotation of the shank 106 within the bore.

Figure 8:
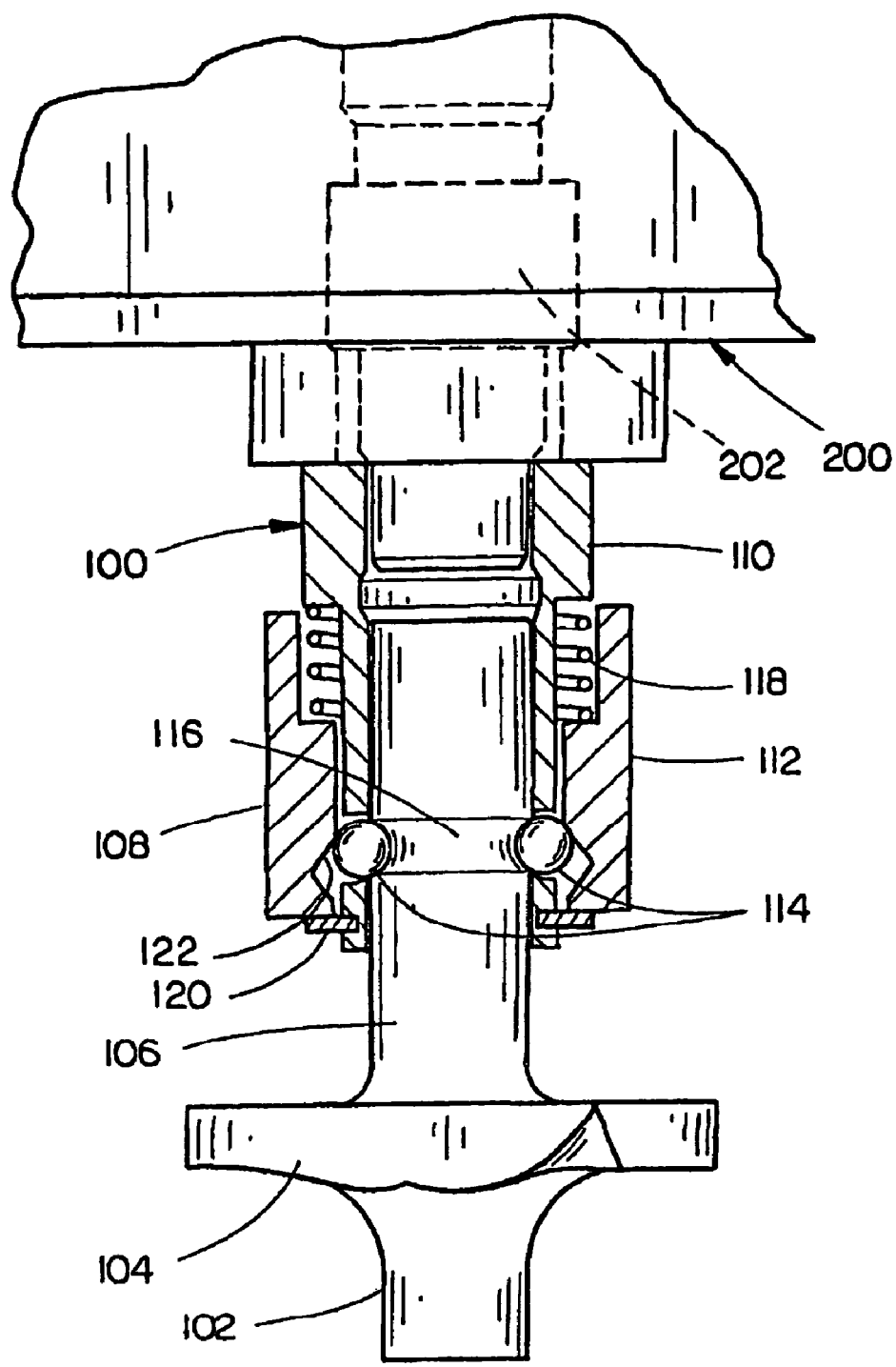
FIG. 8 is a cross-sectional side elevation view illustrating a router bit system including a Morse taper or the like in accordance with an exemplary embodiment of the present invention.
Figure 9:
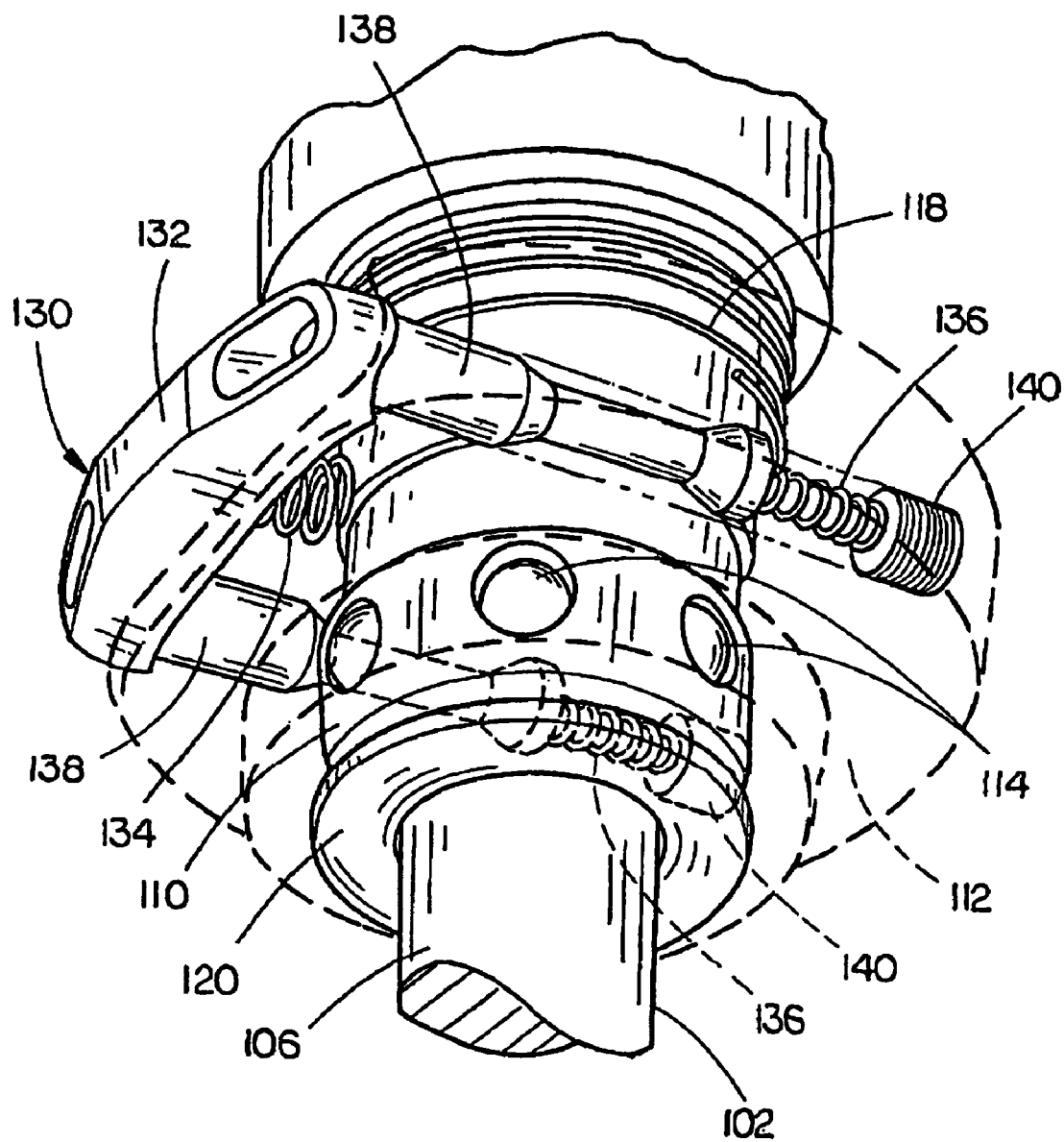
FIG. 9 is an isometric view illustrating a router bit system including a collar lock in accordance with an exemplary embodiment of the present invention.
Figure 10:
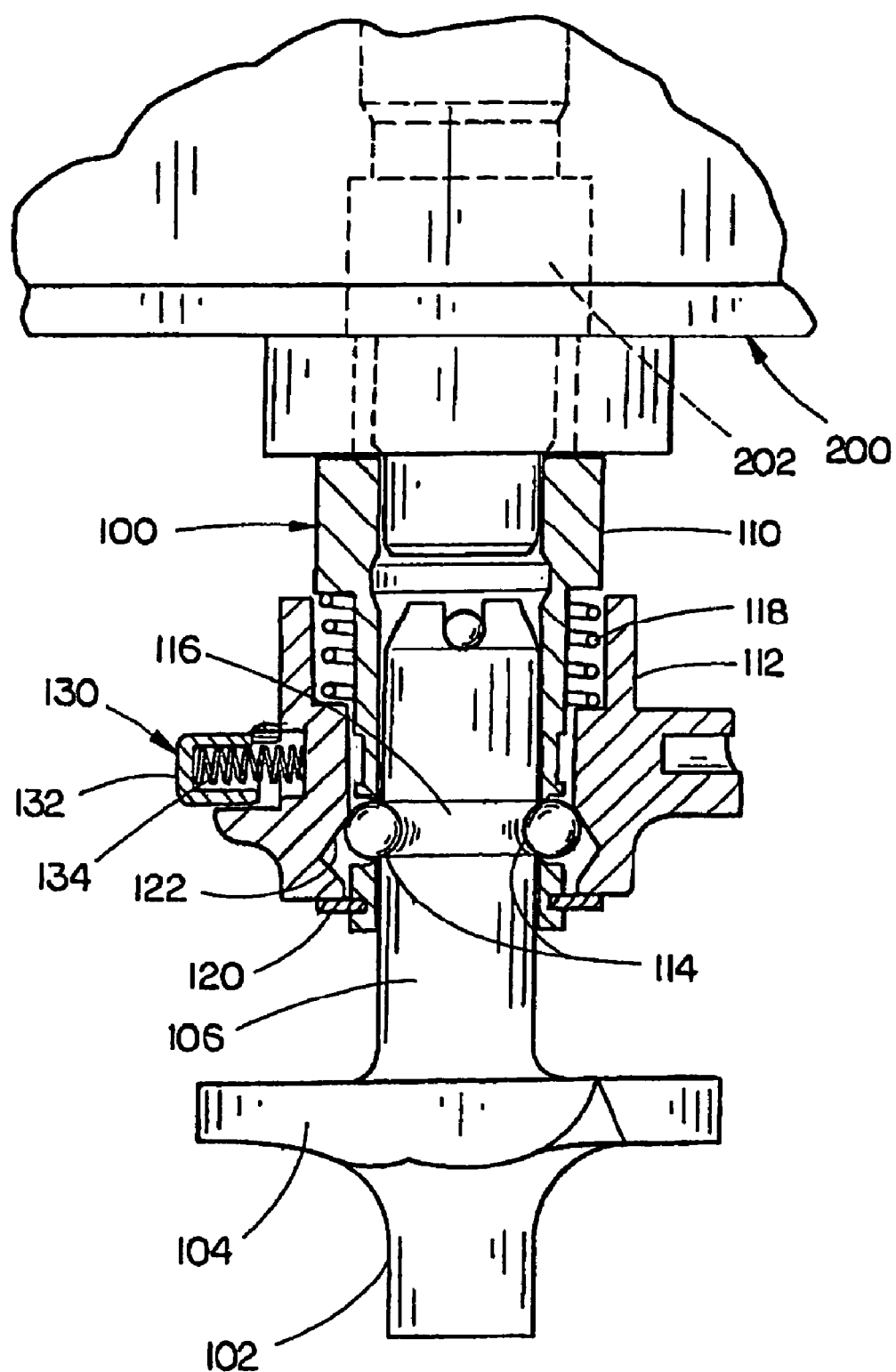
FIG. 10 is a cross-sectional side elevation view of the router bit system illustrated in FIG. 9.

While the shank 106 of the bit 102 may be shaped for engagement with the chuck 110 for at least substantially preventing rotation of the shank 106 within the bore of the chuck 110, those of ordinary skill in the art will appreciate that the balls 114 for engaging the annular groove 116 formed in the shank 106 may also serve to at least substantially prevent rotation of the shank 106 within the bore. Referring to FIG. 8, a bit holding assembly 108 in accordance with an exemplary embodiment of the present invention includes a chuck 110 having one or more radially formed openings for receiving balls 114 retained between the chuck 110 and a collar 112. The openings are shaped for allowing the balls 114 to extend at least partially into a bore of the chuck 110, for engaging an annular groove 116 formed in a shank 106 of a bit 102 when the shank 106 is received in the bore, for preventing rotation of the shank 106 within the bore of the chuck 110 and preventing the shank 106 from dropping out of the chuck 110. The annular groove 116 may include a Morse taper or the like for preventing rotation of the shank 106 within the bore.

Figure 11:
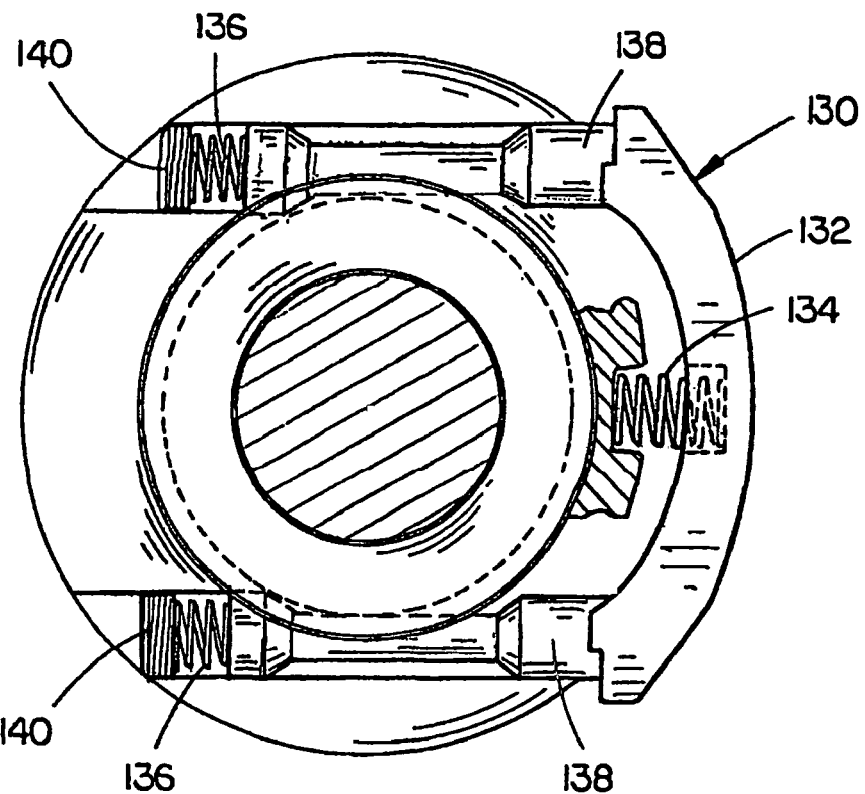
FIG. 11 is a partial cross-sectional plan view of the router bit system illustrated in FIG. 9, wherein the collar lock is engaged.
Figure 12:
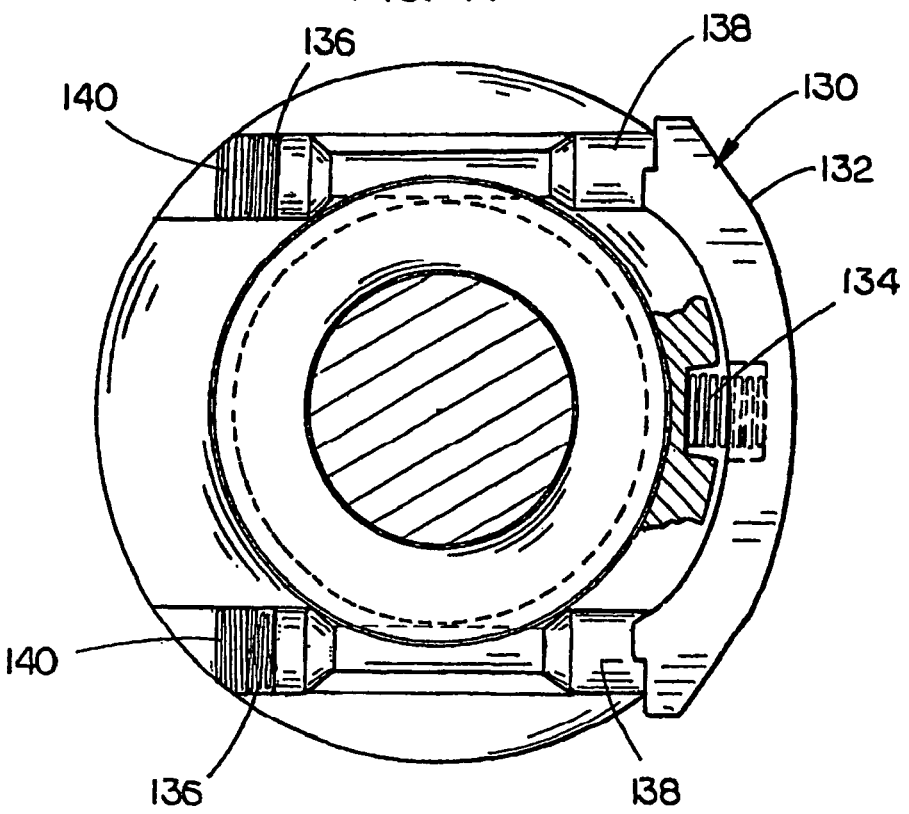
FIG. 12 is a partial cross-sectional plan view of the router bit system illustrated in FIG. 9, wherein the collar lock is disengaged.

Referring now to FIGS. 9 through 12, a bit holding assembly 108 in accordance with exemplary embodiments of the present invention includes a collar 112 concentrically coupled with a chuck 110 for engaging and releasing a bit 102 from the bit holding assembly 108. The collar 112 includes a collar lock 130 for engaging the collar 112 with the chuck 110, for fixing the axial position of the collar 112 and at least substantially preventing positional adjustment of the collar 112 until a pushbutton 132 is moved from an engaged position to a disengaged position. The engaged position is for fixing the axial position of the collar 112 and engaging the collar 112 with the chuck 110, and the disengaged position is for releasing the collar 112 from the chuck 110. For example, the collar lock 130 may be moved to an engaged position for fixing the axial position of the collar 112 with respect to the chuck 110 for retaining the ball 114 in engagement with the annular groove 116. For instance, the collar lock 130 may include engaging pins 138 connected to the pushbutton 132. When the pushbutton 132 is moved to the engaged position, as illustrated in FIG. 11, the engaging pins 138 contact the chuck 110 for engaging the collar 112 with the chuck 110. The contact between the engaging pins 138 and the chuck 110 may be frictional or the like for fixing the axial position of the collar 112 with respect to the chuck 110. Those of ordinary skill in the art will appreciate that centripetal force generated by the spinning of a router drive shaft or the like connected to the bit holding assembly 108 may additionally serve to at least substantially force the engaging pins 138 against the collar 110 for engaging the collar 112 with the chuck 110. When the pushbutton 132 is moved to the disengaged position, as illustrated in FIG. 12, the engaging pins 138 disengage the collar 112 from the chuck 110. While the exemplary embodiments illustrated in the accompanying figures includes generally hourglass-shaped engaging pins 138, it should be noted that a variety of engaging pins 138 may be used for fixing the axial position of the collar 112 and engaging the collar 112 with the chuck 110 without departing from the scope and intent of the present invention. For example, engaging pins 138 having detentions, indentations, semicircular indentations, bent portions, and the like may be used for abutting the chuck 110, fixing the axial position of the collar 112 and engaging the collar 112 with the chuck 110. It should also be noted that more or fewer engaging pins 138 may be used without departing from the scope and spirit of the present invention.

In exemplary embodiments of the present invention, the collar lock 130 is biased to the engaged position for preventing unwanted positional adjustment of the collar 112. Additionally, the collar lock 130 may be at least substantially balanced across an axis of rotation of the bit holding assembly 108 in the engaged position or the like for smooth and efficient operation of the router assembly 200 or the like. In a presently preferred embodiment of the invention, the collar lock 130 may be biased to the engaged position with a spring 134 compressed between the pushbutton 132 and the collar 112. In further exemplary embodiments, pin springs 136 may compressed between the engaging pins 138 and set screws 140 threadably connected to the collar 112. Those of ordinary skill in the art will appreciate that the spring 134 may be used in combination with the pin springs 136, or any other combination thereof. It should be further noted that more or fewer springs may be used without departing from the scope and intent of the present invention.

In another embodiment of the present invention, a collar lock 130 for a collar 112 concentrically coupled with a chuck 110 may include a twist lock or the like. For instance, the chuck 110 may include a protrusion such as a pin or the like for sliding through a generally L-shaped recessed portion or the like in the collar 112. The collar 112 may be twisted to align the protrusion in the chuck 110 with an axial leg of the L-shaped recessed portion for axial positional adjustment of the collar 112 relative to the chuck 110. The collar 112 may also be twisted to align the protrusion in the chuck 110 with the end of a tangential leg of the L-shaped recessed portion for at least substantially preventing axial positional adjustment of the collar 112. The L-shaped portion in the collar 112 may be designed to retain the protrusion in the tangential leg of the L-shaped recessed portion through centripetal force from the spinning motion of a router drive shaft, a notch, a groove, or the like. Those of ordinary skill in the art will appreciate that a number of combinations of protrusions and recessed portions may be used for engaging the collar 112 with the chuck 110 without departing from the scope and intent of the present invention.

Those of ordinary skill in the art will recognize that while the present invention has been disclosed for a router assembly such as a hand-held router, a router table, a pocket cutter, a laminate trimmer, a rotary cutout tool, and the like and uses the term "router," it is possible to use the (router bit) system of the present invention for other applications using a spinning bit (e.g. drills, drill presses, and the like).

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A router bit system, comprising:
    a bit including a cutting head and a shank, the shank having an annular groove formed therein; and
    a router bit holding assembly including:
        a chuck having a bore with a generally cylindrical portion for receiving the shank, the chuck having an opening radially formed in the generally cylindrical portion of the bore;
        a ball received in the opening for engaging the annular groove of the shank when the shank is received in the bore;
        a collar concentrically disposed about the chuck, the collar sliding axially between a first position and a second position,
    wherein when the collar is moved to the first position the collar is configured to hold the ball in engagement with the annular groove and when the collar is moved to the second position the collar is configured to allow the ball to be disengaged from the annular groove,
    wherein the collar comprises an internal annular tapered groove for biasing the ball inwardly within the opening in the chuck when the collar is moved to the first position.

2. The router bit system as claimed in claim 1, further comprising a spring assembly for biasing the collar to the first position.

3. The router bit system as claimed in claim 2, wherein spring assembly comprises a compression spring, the compression spring being compressed as the collar is moved to the second position.

4. The router bit system as claimed in claim 1, wherein the shank includes a first end and a second end, the first end being coupled to the cutting head and the second end being tapered for facilitating insertion into the bore.

5. The router bit system as claimed in claim 4, wherein the bore is configured to receive the second end of the shank.

6. The router bit system as claimed in claim 1, wherein the shank includes a first end and a second end, the first end being coupled to the cutting head and the second end being shaped for engagement with the chuck when the shank is received in The bore to at least substantially prevent rotation of the shank within the bore.

7. The router bit system as claimed in claim 6, wherein the second end comprises a slot formed therein, and the chuck includes a pin extending through the bore for engaging the slot when the shank is received in the bore.

8. The router bit system as claimed in claim 6, wherein the second end comprises a faceted portion and the chuck includes a corresponding faceted portion that engages the faceted portion of the second end.

9. A router bit holding assembly for receiving a bit including a cutting head and a shank, the shank having an annular groove formed therein, comprising:
    a chuck having a bore with a generally cylindrical portion for receiving the shank, the chuck having an opening radially formed in the generally cylindrical portion of the bore;
    a ball received in the opening for engaging the annular groove of the shank when the shank is received in the bore;
    a collar concentrically disposed about the chuck, the collar sliding axially between a first position and a second position,
    wherein when the collar is moved to the first position the collar is configured to hold the ball in engagement with the annular groove to at least substantially prevent rotation of the shank within the bore when the chuck is rotated, and when the collar is moved to the second position the collar is configured to allow the ball to be disengaged from the annular groove,
    wherein the collar comprises an internal annular tapered groove for biasing the ball inwardly within the opening in the chuck when the collar is moved to the first position.

10. The router bit holding assembly as claimed in claim 9, further comprising a spring assembly for biasing the collar to the first position.

11. The router bit holding assembly as claimed in claim 10, wherein the spring assembly comprises a compression spring, the compression spring being compressed as the collar is moved to the second position.

12. The router bit holding assembly as claimed in claim 9, wherein the bore is configured to receive a tapered end of the shank.

13. The router bit holding assembly as claimed in claim 9, wherein the chuck includes an anti-rotation portion that engages the shank when the shank is received in the bore to at least substantially prevent rotation of the shank within the bore.

14. The router bit system as claimed in claim 13, wherein the anti-rotation portion comprises a faceted portion that engages a corresponding faceted portion of the shank.

15. The router bit holding assembly as claimed in claim 13, wherein anti-rotation portion comprises a pin extending through the bore for engaging a slot formed in the shank when the shank is received in the bore.

16. The router bit system as claimed in claim 9, wherein when the collar is moved to the first position, the ball at least substantially prevents rotation of the shank within the bore when the chuck is rotated.

* * * * *